US011024188B2

(12) United States Patent
    Skaggs (10) Patent No.: US 11,024,188 B2
(45) Date of Patent: Jun. 1, 2021

(54) EDUCATIONAL TOY NUMBER STACKING BLOCKS

(71) Applicant: Benjamin David Skaggs, Paradise, UT (US)

(72) Inventor: Benjamin David Skaggs, Paradise, UT (US)

(*) Notice: Subject to any disclaimer, the term of this patent is extended or adjusted under 35 U.S.C. 154(b) by 0 days.

(21) Appl. No.: 16/858,464

(22) Filed: Apr. 24, 2020

(65) Prior Publication Data

US 2020/0349856 A1    Nov. 5, 2020

Related U.S. Application Data

(63) Continuation of application No. 15/441,193, filed on Feb. 23, 2017, now abandoned, which is a continuation of application No. 14/202,002, filed on Mar. 10, 2014, now abandoned.

(60) Provisional application No. 61/801,767, filed on Mar. 15, 2013.

(51) Int. Cl.
    *G09B 1/34*      (2006.01)
    *G09B 19/02*     (2006.01)

(52) U.S. Cl.
    CPC ............. *G09B 1/34* (2013.01); *G09B 19/02* (2013.01)

(58) Field of Classification Search
    CPC . G09B 1/34; G09B 1/40; G09B 19/02; G09B 23/02
    USPC .......................... 434/193, 195, 196; 446/117
    See application file for complete search history.

(56) References Cited

U.S. PATENT DOCUMENTS

| | | | | | |
|---|---|---|---|---|---|
| 2,494,497 | A | * | 1/1950 | Trapnell | G09B 19/02 434/204 |
| 2,635,355 | A | * | 4/1953 | Thompson | G09B 19/02 434/195 |
| 2,950,542 | A | * | 8/1960 | Steelman | G09B 19/02 434/195 |
| 3,002,295 | A | * | 10/1961 | Armstrong | G09B 19/02 434/195 |
| 3,229,388 | A | * | 1/1966 | Smith | G09B 19/02 434/195 |
| 3,381,394 | A | * | 5/1968 | Munro | G09B 19/02 434/193 |
| 3,414,986 | A | * | 12/1968 | Stassen | G09B 19/02 434/195 |
| 3,766,667 | A | * | 10/1973 | Glassman | G09B 23/04 434/195 |
| 3,918,178 | A | | 11/1975 | Riley | |
| 3,934,357 | A | | 1/1976 | Couvillion | |
| 4,382,794 | A | | 5/1983 | Preus | |
| 4,430,825 | A | | 2/1984 | Leboeuf | |
| 4,518,359 | A | * | 5/1985 | Yao-Psong | G09B 19/02 434/195 |
| 4,812,123 | A | * | 3/1989 | House | G09B 19/02 434/195 |
| 5,074,794 | A | * | 12/1991 | Von Hagen | G09B 1/06 434/159 |

(Continued)

*Primary Examiner* — Joseph B Baldori
(74) *Attorney, Agent, or Firm* — Kilpatrick Townsend & Stockton LLP (57) ABSTRACT

The present invention includes a set of stacking blocks designed to resemble the Arabic numerals 1-10. Each number block is height proportional to its value, and they can be stacked vertically. This feature allows students to see the relationship between numbers, and discover math concepts as they stack or play.

11 Claims, 7 Drawing Sheets

(56) References Cited

U.S. PATENT DOCUMENTS

| | | | | |
|---|---|---|---|---|
| 5,421,732 A | * | 6/1995 | Taylor | A63F 3/0415 |
| | | | | 434/195 |
| 5,683,252 A | * | 11/1997 | Tsao | A63F 9/0098 |
| | | | | 434/195 |
| 7,077,654 B2 | * | 7/2006 | Burtness | G09B 19/02 |
| | | | | 434/188 |
| 2008/0268407 A1 | * | 10/2008 | Brett | G09B 19/02 |
| | | | | 434/195 |
| 2010/0216101 A1 | * | 8/2010 | Chung | G09B 19/02 |
| | | | | 434/188 |
| 2014/0272829 A1 | * | 9/2014 | Skaggs | G09B 1/34 |
| | | | | 434/193 |
| 2017/0206792 A1 | * | 7/2017 | Skaggs | G09B 19/02 |

* cited by examiner

EDUCATIONAL TOY NUMBER STACKING BLOCKS

CROSS REFERENCE TO EXISTING APPLICATIONS

This application is a continuation of U.S. patent application Ser. No. 15/441,193, filed Feb. 23, 2017, which is a continuation of U.S. patent application Ser. No. 14/202,002, filed Mar. 10, 2014, which claims the benefit of U.S. Provisional Patent Application No. 61/801,767, filed Mar. 15, 2013, all of which are incorporated herein by reference in their entirety for all purposes.

FIELD OF THE INVENTION

The present invention relates to educational toys and particularly to a manipulative aid for teaching arithmetic concepts. More particular, the present invention relates to teaching arithmetic through repetitive play using vertically stackable, toy building blocks, in the shape of numbers that are scaled according to their height value.

BACKGROUND OF THE INVENTION

Many previous inventions, whether teaching numerical values through elongated blocks or scaling numbers in relation to their value, require users to do the work of associating measurements to their respective symbols (usually painted on the front), or they simply lack the interconnectivity to provide long lasting engagement.

U.S. Pat. No. 3,934,357 to Couvillion and titled: TEACHING METHOD AND APPARATUS, teaches arithmetic using numeric cutouts that scale in height according to their numeric value. While this design succeeds in making numeric values more clear through size representations, the cutouts do not stack one atop the other so that each number is discernable.

U.S. Pat. No. 4,382,794 to Preus and titled: INSTRUCTIONAL AID, is intended to teach basic arithmetic using blocks in the shape of numeric symbols, that have a width value proportional to each number represented; e.g., the "2 block" is twice the width of the "1 block." While this design is capable of continuously stacking numeric figures on top of one another, because the value representative of the numeral is located on a separate visual plane than the symbol, it is difficult to make the intended key memory associations, or see and apprehend those associations when multiple numbers are stacked on top of one another, as the topmost numeric symbols obscure the other symbols. Both Couvillion and Preus offer limited configurations and limited aggregate morphology.

Other patents such as U.S. Pat. Nos. 4,430,825 and 3,918,178 describe inventions that contain the numeric symbols in toy form, but fail to show both critical relationships between numeric symbols and provide a toy that has lasting replay value.

It would be desirable to provide a heavily kinesthetic dependent means for learning number relationships in the form of a stacking numbers toy.

It would be especially desirable to provide educational number blocks whereby the various base-ten numerals may be vertically stacked while maintaining the visibility of the represented number so that comparisons of values may be made by a student while at play.

OBJECTS AND ADVANTAGES OF THE INVENTION

In learning skills that require a lengthy duration to master, kinesthetic learning is only as powerful as the frequency with which it is used. The present invention not only allows the number blocks to be stacked vertically so that students can work with larger math problems, but the blocks stack from many different angles to provide kids with an engaging toy that they will manipulate and enjoy for hours on end. By being visually engaging and functionally instructive, the present invention provides a means for learning numbers and basic concepts core to mathematics wherein blocks representing numbers and their relative values are used for stacking and building. Elements of the present invention encourage students to vertically stack and build a great variety of toy architectural structures. Through the repetition of stacking each number block, students learn to associate each represented number and its relative value in relation to the other number blocks. These associations intuitively reinforce understanding of the base-ten concept and other essential number combinations during play. Block height directly corresponds to respective number value, making critical number associations easily apparent when viewing the numbers. Not only do these aided associations help accelerate the learning of basic number sense, but the stackable design allows users to engage in learning math concepts that span into the more complex realm of fractions, division, percentages. In addition to accelerating the users learning of number sense and basic mathematics, the blocks serve as a powerful visual aid in all forms of arithmetic. Coupled with the design are a series of symbols, including addition, subtraction, multiplication, division, percentages, greater-than, less-than, not-equals, and decimal points all designed in a style unique to this invention. Through repetition and creative exploration the present invention engages students for a time duration necessary to learn basic number relationships, the base-ten concept, and is an engaging visual instruction tool for parent and teacher alike.

SUMMARY

The present invention utilizes the basic numbers zero through ten. A building block is created for each number. With the exception of a zero block having a purely aesthetic shape and size that is nonrepresentational of its value, the number blocks are constructed with specific heights that are relative to one another. The base unit length is derived from the number 1 block which is most often stacked on its side. Accordingly, the base unit length is taken from the width of the number 1 block rather than its height. Each building block has a height in the foregoing base units corresponding to the respective number it represents; e.g., (2=2 units high (height of two "1s"), 3=3 units high). With the exception of the number 1 block, each block is designed to represent its respective number when stacked vertically allowing the person stacking the blocks to associate the respective numeric symbol with its height value. In this way, learning the base-ten concept, key number combinations, and even basic addition and subtraction become intuitive by merely building with the blocks. All blocks stack right-side-up and vertically with all other blocks. Due to the number 4 block's lower right leg, all blocks are four units wide, allowing the number 4 block to be stacked on its side and still remain uniform in width with the other blocks. All blocks have a thickness of two units, allowing users to build within a unified set of measurements.

In one embodiment, the present invention includes number blocks that are shaped and sized to stack as building blocks, in multiple configurations.

In another embodiment, the width and depth of all number blocks are part of a unified measurement system. For example, the number 4 block can be stacked on its side or right-side up to achieve a represented value and stacks in an interconnecting fashion with the number 6 block to reinforce base-ten combinations. In another example, the number 1 block stacks perfectly with number 4 block to allow it to stand on its lower right leg, aiding the vertical stacking theme. In yet another example, the number 9 block stacks atop the number 1 block to complete a base-ten combination.

The foregoing and other objects, features, and advantages of the invention will become more apparent from the following detailed description, which proceeds with reference to the accompanying figures wherein the scale depicted is approximate.

DETAILED DESCRIPTION OF THE PREFERRED EMBODIMENTS

In the following description the term "number" refers to an "integer" i.e., the seven integer is the number seven "7." The term "unit" and "base unit" are used interchangeably. For purposes of clarity, blocks representative of a number are referred to using the Arabic number symbol, e.g., "the number 7 block", while quantitative references of length or width are referred to using the spelled number quantity, e.g., "equivalent to two base units." The term "symbol" refers either to a numeric symbol or calculative symbol. Unless otherwise explained, any technical terms used herein have the same meaning as commonly understood by one of ordinary skill in the art to which this disclosure belongs. The number blocks have sides and two faces which can be thought of as the readable sides. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Figures 1, 2:
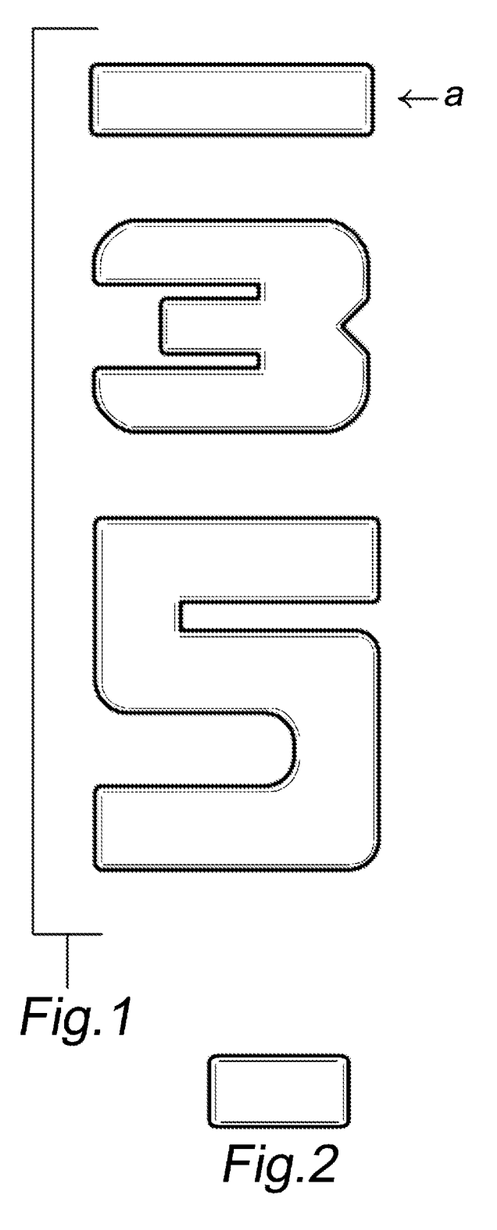
FIG. 1 is a series of plan views showing the number 1 block laid on its side, and number blocks 3 and 5 of a preferred embodiment according to the present invention.
FIG. 2 is a side view of a number one block (FIG. 1) taken from the direction of arrow (a) showing thickness of the blocks.
Figure 3:
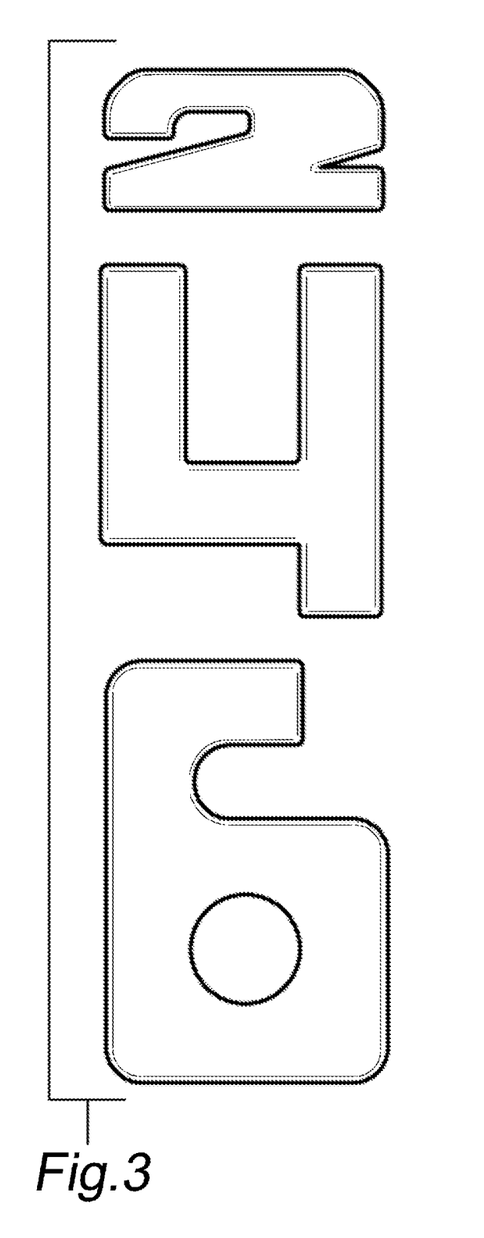
FIG. 3 are plan views showing number blocks 2, 4 and 6 of a preferred embodiment according to the present invention.
Figure 4:
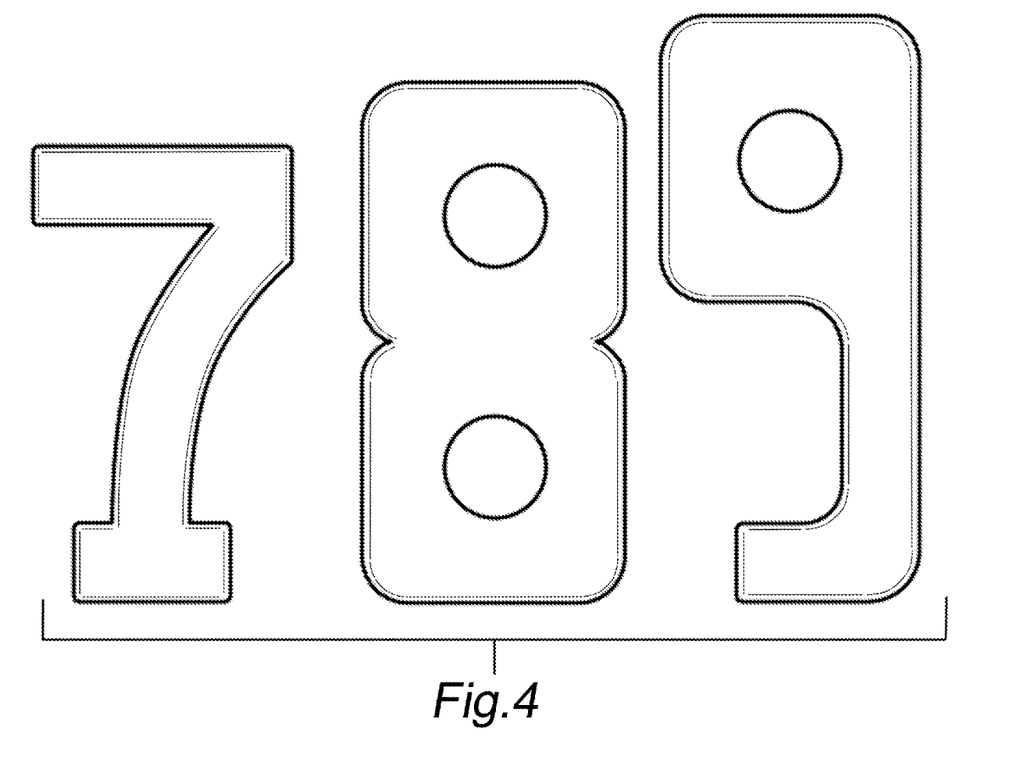
FIG. 4 are plan views showing number blocks 7, 8 and 9 of a preferred embodiment according to the present invention.
Figure 5:
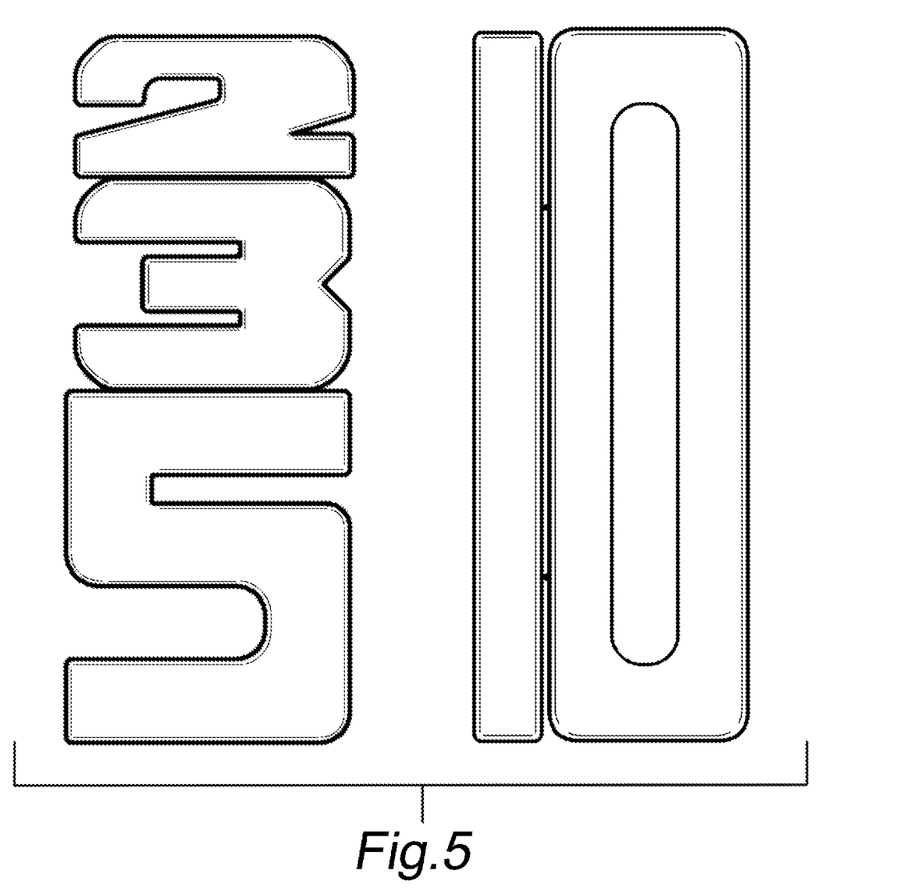
FIG. 5 are plan views showing a stacking arrangement of number blocks 2, 3 and 5 next to a number 10 block.
Figure 6:
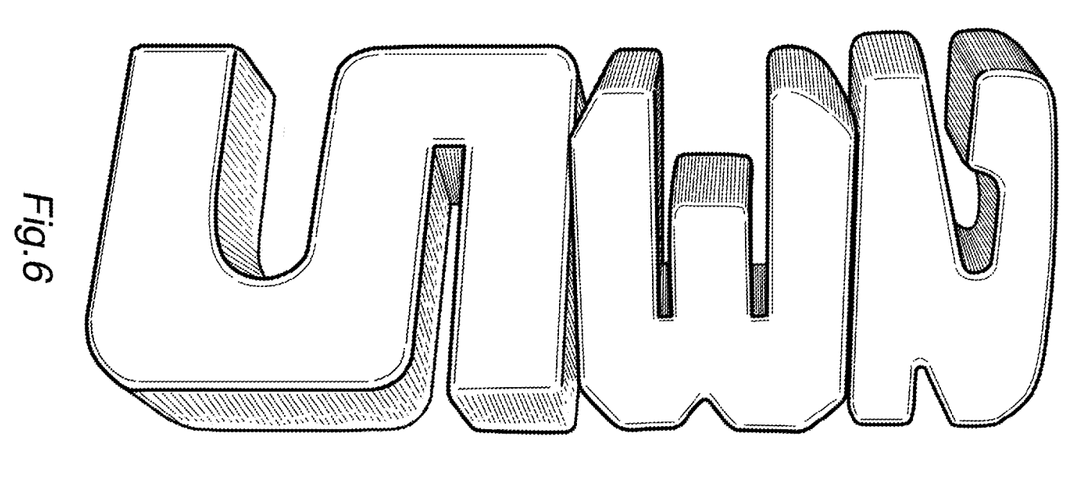
FIG. 6 is a perspective view showing a stacking arrangement of number blocks 2, 3 and 5.
Figures 7, 8, 9, 13, 14, 15:
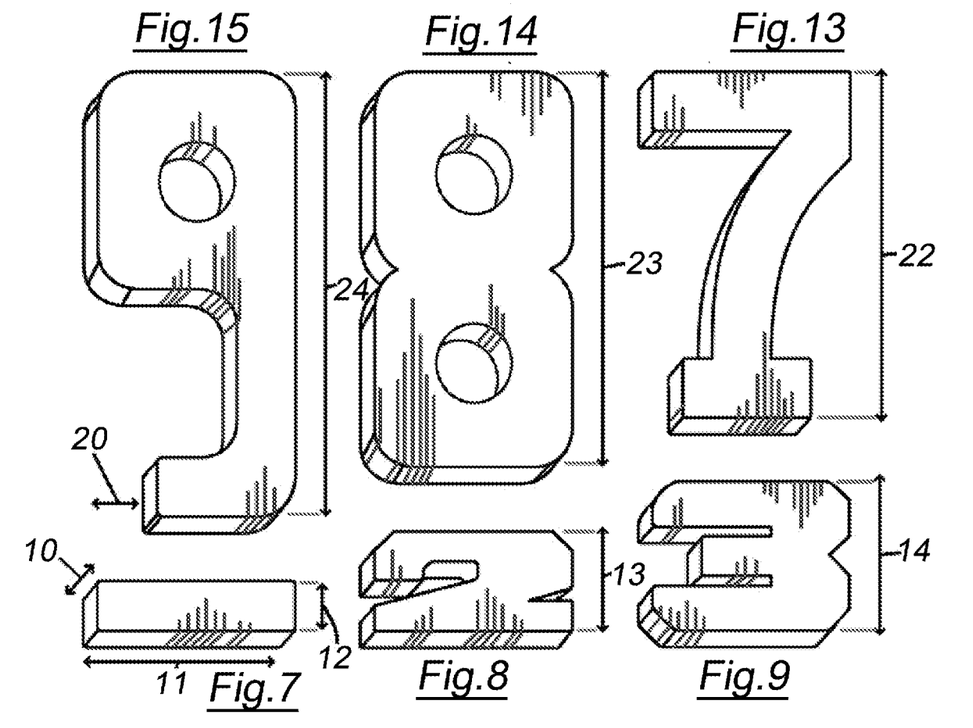
FIGS. 7-16 are orthographic views of a preferred embodiment according to the present invention wherein each figure corresponds to a number block one through nine.

Referring generally to FIGS. 1-26, a preferred embodiment of the present invention includes a series of stackable blocks that are proportional to one another; the base unit of length derived from the number one block. As shown in FIG. 7, a block representative of the Arabic numeral 1 has a thickness 10 of two base units that it shares in common with the elements shown in FIGS. 7-26, comprising double the height 12 of FIG. 7.

Figure 22:
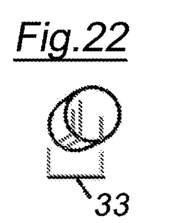
Figure 23:
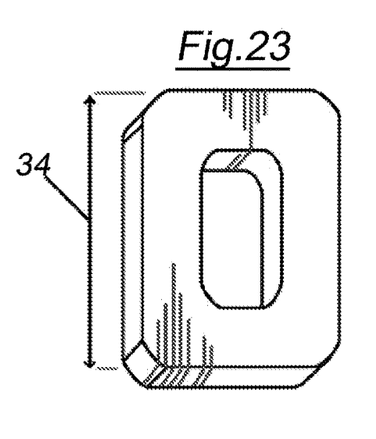

With the exception of FIG. 22, width 11 of FIG. 7 is shared with FIGS. 7-26. FIG. 8, which corresponds to the number 2 block possesses a height 13 of two base units which is double the height value of 12 in FIG. 7, a thickness 10 of two base units and a width 11 of four base units.

FIG. 9, which corresponds to the number 3 block possesses a height 14 of three base units which is triple the height value of 12 of FIG. 7, a thickness 10 of two base units and a width 11 of four base units.

Figures 10, 11, 12:
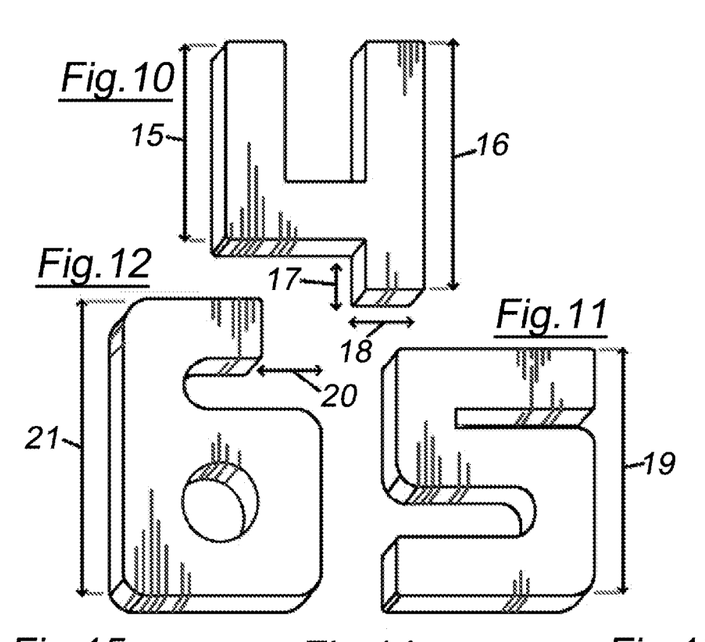

FIG. 10 which corresponds to the number 4 block has two heights, 15 and 16, belonging to the left and right side of FIG. 10 respectively. The left height measurement 15 of four base units coincides with the exact width 11 of all numbers FIGS. 7-15, and is a height value four times that of 12. Right height measurement 16 is five base units. FIG. 10 also has thickness 10 equivalent to two base units, a general width 11 of four base units wherein the width 18 of the protruding leg of the number 7 block is the equivalent of 1 base unit. Height 17, is also one base unit.

FIG. 11, which corresponds to the number 5 block has a height 19 of five base units, a thickness 10 of two base units, and a width 11 of four base units.

FIG. 12, which corresponds to the number 6 block, has a height 21 of six base units, a thickness 10 of two base units, and a general width 11 of four base units. The upper right corner of the number element shown in FIG. 12, has a subtracted area 20 of one base unit that allows it to interconnect with the number 4 block (FIG. 10) and maintain a uniform width between the two figures.

FIG. 13, which corresponds to the number 7 block, it has a height 22 of 7 base units, a thickness of 2 base units, and a general width 11 of 4 base units.

FIG. 14, corresponding to the number 8 block, it has a height 23 of 8 base units, a thickness 10 of two units, and a width 11 of four units.

FIG. 15, corresponding to the number 9 block, it has a height 24 of nine units, a thickness 10 of two units, and a width 11 of four units.

Figure 16:
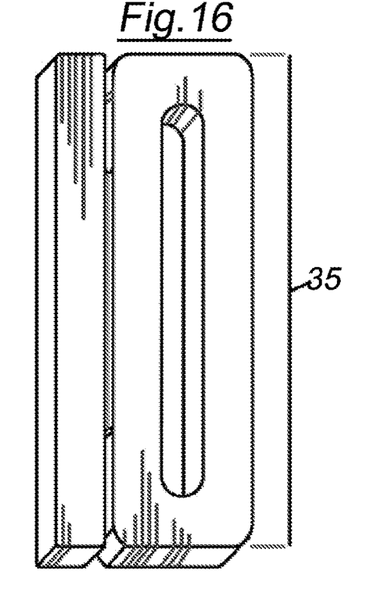

FIG. 16 corresponds to the number ten, has a height 35 of ten base units, a thickness 10 of two base units and a width 11 of four base units.

The bottom left corner of the element depicted in FIG. 15 has a subtracted area 20 of one unit that allows it to interconnect with the number 4 block and maintain a uniform width between the two figures.

Figure 17:
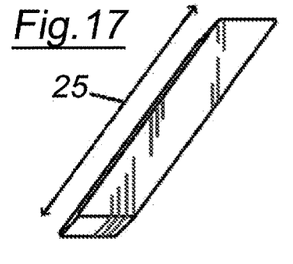
FIGS. 17 through 23 are orthographic views of objects corresponding to mathematical symbols used in basic arithmetic as well as number blocks corresponding to the numbers zero and ten.
Figure 18:
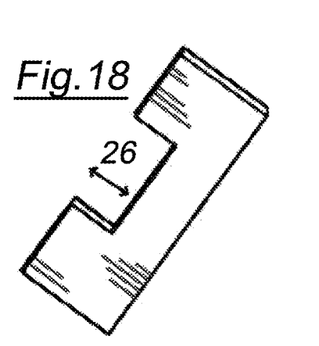
Figure 19:
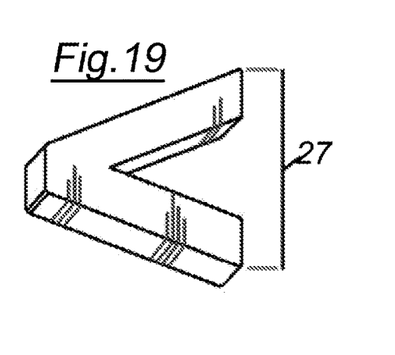
Figures 20, 21:
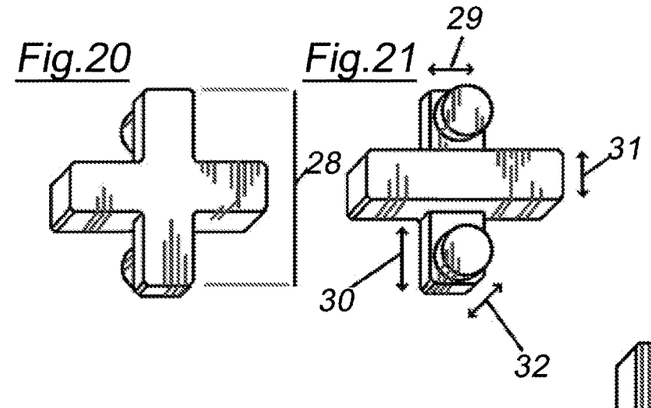

FIGS. 17 and 18 correspond to the vertical slash in a not-equals symbol, and possess a diagonal length 25 of four and four fifths units, a thickness 10 of two units, and a width 12 of one unit. FIG. 19 corresponds to the symbols greater-than and less-than, and possesses a height 27 of four units, a thickness 10 of two units and a horizontal width 11 of four units. FIG. 20 (orthographic-back view) and FIG. 21 (orthographic-front view), correspond to the mathematical symbols, add, multiply, divide and percent, and possess a height and width 28 of four base units when measured along the cross sections. Width 29 and 31 of each cross section measures one base unit. The thickness of the vertical cross section is split midway through the element depicted in FIGS. 20 and 21 where circular attachments one unit thick connect and produce the division symbol. These circular attachments depicted in FIG. 22, have a diameter 33 of four fifths of a base unit and a thickness of one base unit.

Figures 24, 25, 26:
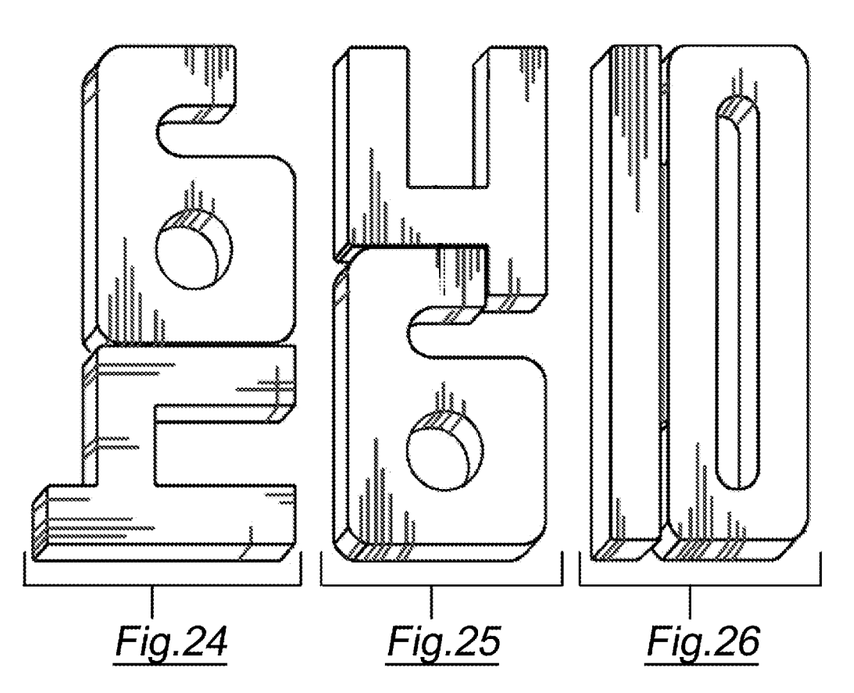
FIGS. 24 through 26 are orthographic views of various number blocks of a preferred embodiment shown in relation to one another.

FIG. 24 depicts a grouping of the number 4 and number 6 blocks, and illustrates how the number 4 block can be placed horizontally and stacked with the number 6 block to achieve the same height as when the number 4 block is stacked vertically and interconnectedly, on top of the number 6 block as shown in FIG. 25.

Both FIG. 24 and FIG. 25 show how the objects represented can be combined in their respective numeral pairs to match the height of the object representing the integer ten as shown in FIG. 26.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. An educational system comprising:
a first three-dimensional number shaped structure that is free-standing and formed in a shape of a number one, wherein when laying on a side of the first three-dimensional number shaped structure, the first three-dimensional number shaped structure comprises dimensions of a first height, a width and a depth, wherein the first height is equal to a base unit, the width is equal to the base unit multiplied by four, and the depth is equal to the base unit multiplied by two;
a second three-dimensional number shaped structure that is free-standing and formed in a shape of a number four, wherein when standing upright, the second three-dimensional number shaped structure comprises dimensions of a second height, the width, and the depth, wherein the second height is greater than the base unit multiplied by four; and
a third three-dimensional number shaped structure that is free-standing and formed in a shape of a third number selected from two, three, five, six, seven, eight, or nine, wherein when standing upright, the third three-dimensional number shaped structure comprises dimensions of a third height, the width, and the depth, wherein the third height is equal to the base unit multiplied by a value of the third number, and wherein a first ratio of the third height to the first height is identical to a second ratio of the value of the third number to one.

2. The educational system of claim 1, further comprising a fourth three-dimensional number shaped structure that is free-standing and formed in a shape of a number ten, wherein the fourth three-dimensional number shaped structure comprises dimensions of a fourth height, the width and the depth, wherein the fourth height is equal to the base unit multiplied by ten.

3. The educational system of claim 1, wherein the third number is a number six and wherein the second three-dimensional number shaped structure is configured to be placed on top of the third three-dimensional number shaped structure such that a total height of the second three-dimensional number shaped structure and the third three-dimensional number shaped structure is ten times the base unit.

4. The educational system of claim 1, further comprising a fourth three-dimensional shaped structure representing an arithmetic operator, wherein the arithmetic operator is one of plus, minus, multiply, or divide, and comprises a fourth height and the width, wherein the fourth height equals the width.

5. The educational system of claim 1, further comprising a fourth three-dimensional shaped structure that is free-standing and formed in a shape of a mathematical plus symbol, wherein the fourth three-dimensional shaped structure comprises dimensions of a fourth height and the width, wherein the fourth height equals the width.

6. The educational system of claim 5, further comprising a first circular shape and a second circular shape, are positioned on the mathematical plus symbol, thereby forming a mathematical divide symbol.

7. The educational system of claim 1, further comprising a fourth structure that is formed in an additional shape of a number zero.

8. An educational system comprising:
a first three-dimensional number shaped structure formed in a first shape of a number one, wherein when laying on a side of the first three-dimensional number shaped structure the first three-dimensional number shaped structure comprises dimensions of a first height and a width, wherein the width is four times the first height;
a second three-dimensional number shaped structure formed in a second shape of a number two, wherein the second three-dimensional number shaped structure comprises dimensions of (i) a second height that is twice the first height and the width;
a third three-dimensional number shaped structure formed in a third shape of a number three, wherein the third three-dimensional number shaped structure comprises dimensions of (i) a third height that is three times the first height and (ii) the width;
a fourth three-dimensional number shaped structure formed in a fourth shape of a number four, wherein when laying on a side of the fourth three-dimensional number shaped structure, the fourth three-dimensional number shaped structure comprises dimensions of (i) a fourth height that is four times the first height and (ii) a second width that is greater than the width;
a fifth three-dimensional number shaped structure formed in a fifth shape of a number five, wherein the fifth three-dimensional number shaped structure comprises dimensions of (i) a fifth height that is five times the first height and (ii) the width;
a sixth three-dimensional number shaped structure formed in a sixth shape of a number six, wherein the sixth three-dimensional number shaped structure comprises dimensions of (i) a sixth height that is six times the first height and (ii) the width;
a seventh three-dimensional number shaped structure formed in a seventh shape of a number seven, wherein the seventh three-dimensional number shaped structure comprises dimensions of (i) a seventh height that is seven times the first height and (ii) the width;

an eighth three-dimensional number shaped structure formed in a eighth shape of a number eight, wherein the eighth three-dimensional number shaped structure comprises dimensions of (i) an eighth height that is eight times the first height and (ii) the width;

a ninth three-dimensional number shaped structure formed in a ninth shape of a number nine, wherein the ninth three-dimensional number shaped structure comprises dimensions of (i) a ninth height that is nine times the first height and (ii) the width; and a tenth three-dimensional number shaped structure formed in a tenth shape of a number ten, wherein the tenth three-dimensional number shaped structure comprises dimensions of (i) a tenth height that is ten times the first height and (ii) the width.

9. The educational system of claim 8, further comprising:

an additional structure representing an arithmetic operator, wherein the arithmetic operator is one of plus, multiply, or divide, and comprises an eleventh height that equals the width.

10. The educational system of claim 8, further comprising an additional structure that is formed in an additional shape of a number zero.

11. The educational system of claim 8, wherein when the sixth three-dimensional number shaped structure is placed on top of the fourth three-dimensional number shaped structure, a combined height of the sixth three-dimensional number shaped structure and the fourth three-dimensional number shaped structure equals the tenth height.

\* \* \* \* \*